L. L. GREGG, Jr.
TIRE SECURING MECHANISM.
APPLICATION FILED JULY 14, 1911.

1,029,604.

Patented June 18, 1912.
2 SHEETS—SHEET 1.

WITNESSES:
R. E. Hamilton
E. B. House

INVENTOR.
Luther L. Gregg Jr.
BY Warren D. House
His ATTORNEY.

L. L. GREGG, Jr.
TIRE SECURING MECHANISM.
APPLICATION FILED JULY 14, 1911.
1,029,604.
Patented June 18, 1912.
2 SHEETS—SHEET 2.
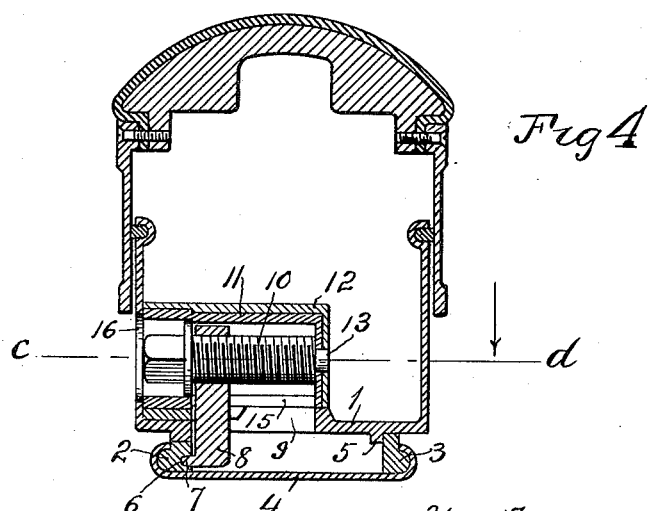
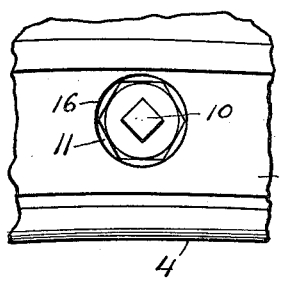
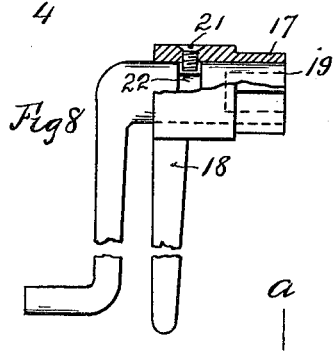
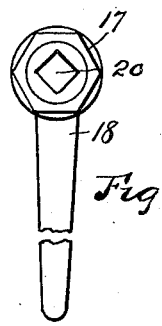
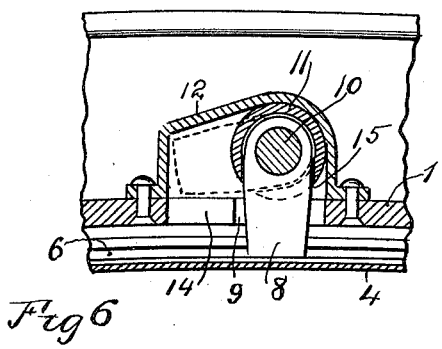
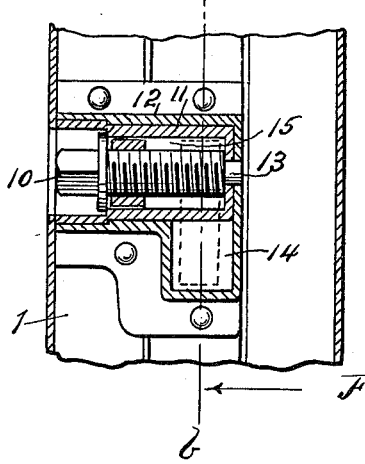
WITNESSES:
R. E. Hamilton
E. B. House
INVENTOR.
Luther L. Gregg Jr.
BY Warren D. House
His ATTORNEY.

UNITED STATES PATENT OFFICE.

LUTHER L. GREGG, JR., OF LONEJACK, MISSOURI.

TIRE-SECURING MECHANISM.

1,029,604.      Specification of Letters Patent.      Patented June 18, 1912.

Application filed July 14, 1911. Serial No. 638,489.

*To all whom it may concern:*

Be it known that I, LUTHER L. GREGG, Jr., a citizen of the United States, residing at Lonejack, in the county of Jackson and State of Missouri, have invented certain new and useful Improvements in Tire-Securing Mechanisms, of which the following is a specification.

My invention relates to improvements in tire securing mechanisms.

The object of may invention is to provide a reliable, simple and durable mechanism for releasably securing tires of vehicles to rims of the "clencher" type.

The novel features of my invention are hereinafter fully described and claimed.

Figure 1:
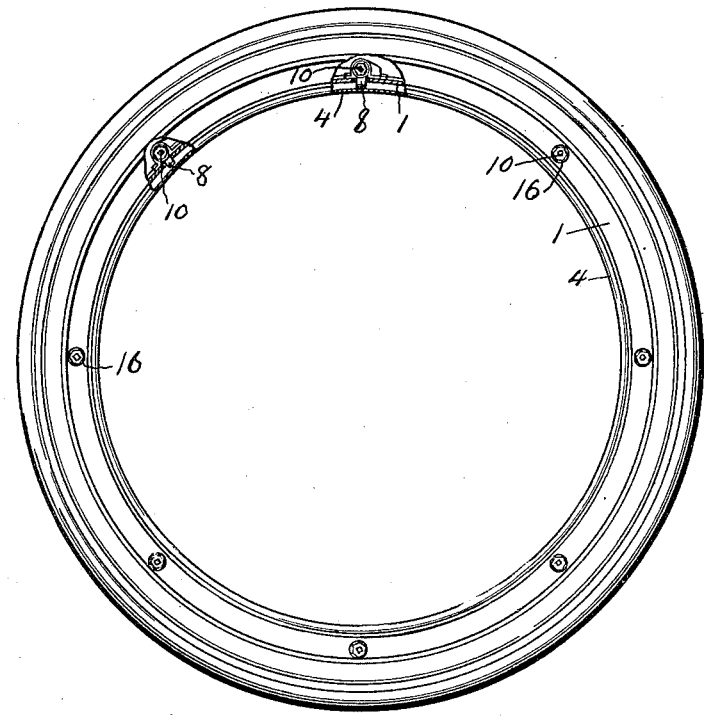
Figure 2:
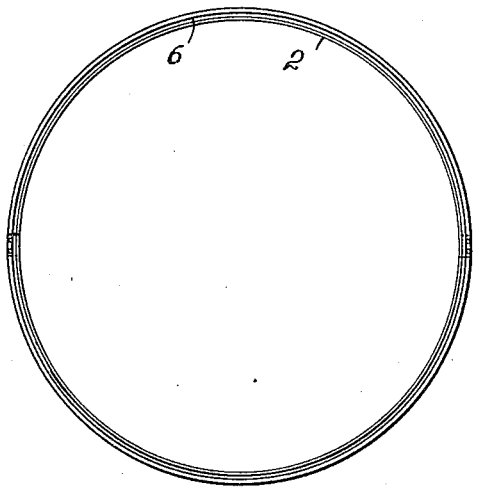
Figure 3:
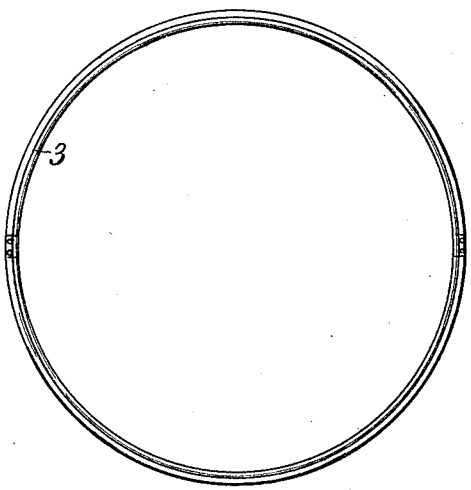

In the accompanying drawings which illustrate one form of my invention, Figure 1 is a side view partly broken away of a tire and rim secured together with my improved securing mechanism. Figs. 2 and 3 are side views of the two rings respectively which fit into the grooves of the clencher rim. Fig. 4 is an enlarged cross section view. Fig. 5 is a side view of a part of what is shown in Fig. 4. Fig. 6 is a vertical section on the line a—b of Fig. 7. In this view the locking member is shown in dotted lines in the position which permits the removal of the tire member. Fig. 8 is a view partly in side elevation and partly broken away of the crank mechanism for adjusting the bolts or screws which actuate the locking members. Fig. 9 is an end view of what is shown in Fig. 8.

Similar reference characters designate similar parts.

1 designates an annular tire member which may be of any suitable form, and which is shown as being of channel form in the drawing.

2 and 3 designate respectively two rings which are adapted to be mounted respectively in the two grooves of a rim 4 of the "clencher" type. The tire member 1 encircles the rings 2 and 3 by which the tire member is supported. The inner periphery of the tire member 1 is provided with a projection 5, preferably of annular form, and which engages the inner side of the ring 3. The ring 2 has on its inner side an annular groove 6 which is adapted to receive the outwardly turned projections 7 of a plurality of radial locking members 8, which extend respectively through slots 9 provided in the tire member 1. The locking members 8 are provided with transverse screw threaded holes in which are respectively fitted transverse screws or bolts 10, which are respectively rotatively mounted in casings 11, which are pivotally mounted in housings 12 respectively. The housings 12 are secured to the outer periphery of the transverse portion of the tire member 1 and cover the slots 9. The screws 10 are provided each with an axial trunnion 13, which extends through the inner end of the casing and housing adjacent thereto. By turning the screws 10, the locking members 8 may be moved transversely of the tire member 1 in the slots 9 to and from positions in which the projections 7 will be in the annular groove 6. Each slot 9 is provided, as best shown in Fig. 6 and Fig. 7, with a lateral portion 14 through which the adjacent locking member 8 may be swung to the position shown in dotted lines in Figs. 6 and 7, when it is desired to detach the tire member from the rim, or when it is desired to mount the tire member on the rim. The casings 11 have longitudinal slots 15 through which the locking members 8 extend and in which the said locking members are respectively slidable transversely to the tire member.

One side of the tire member 1 is provided with a plurality of holes 16 which are disposed opposite respectively to the screws 10, and which are adapted to receive the hexagonal portion 17 of a wrench 18 in which is rotatively mounted another crank wrench 19 having a socket 20 adapted to receive the square heads of the screws 10. The wrench 18 has mounted in it a screw 21 which projects into a peripheral annular groove 22 in the wrench 19, thus permitting rotation of the wrench 19 in the wrench 18. The outer end of each casing 11 on its inner side is of hexagonal shape and fitted to the portion 17 of the wrench 18.

The rings 2 and 3 are composed each of two semicircular members which are detachable from each other so as to permit of the rings being mounted in the rim grooves.

In mounting the tire member on a rim, the two rings 2 and 3 are first fitted in the grooves of the clencher rim. The wrench 18 is then inserted into the casings 11 successively, the wrench 19 being then turned so as to bring the locking members 8 to positions registering with the offset portions 14 of the slots 9, after which the wrench 18 is turned so as to swing the casings 11 and screws 10 to the dotted position shown in Fig. 6. The tire member 1 may then be slipped over the rings 2 and 3 which have been mounted in the rim 4. The annular flange projection 5 will strike the inner side of the ring 3, thus limiting the movement of the tire member in that direction. The wrenches 18 and 19 are then applied successively to the casings 11 and screws 10, the casings 11 being turned with the locking members 8 to the position shown in solid lines in Fig. 6. The wrench 19 is then turned so as to move the locking members endwise on the screws 10 to the position shown in Fig. 7, in which position the projections 7 will enter the groove 6 in the ring 2, thereby locking the locking members 8 to the ring 2.

I do not limit my invention to the structure shown and described as many modifications, within the scope of the appended claims, may be made without departing from the spirit of my invention.

Having thus described my invention, what I claim and desire to secure by Letters Patent, is:—

1. In tire securing mechanisms, a ring adapted to be mounted in a groove of a clencher rim, an annular tire member encircling the ring and having a slot, securing means adapted to be mounted in the other groove of the clencher rim and against which the tire member bears, a locking member extending through the slot and having means for lockingly engaging with the ring, and a screw rotatively mounted on the tire member and having threaded engagement with the locking member for moving the locking member laterally to and from the locking position.

2. In tire securing mechanisms, a ring adapted to be mounted in a groove of a clencher rim, an annular tire member encircling the ring and having a slot, securing means adapted to be mounted in the other groove of the clencher rim and against which the tire member bears, a housing on the tire member over the slot, a casing rotatively mounted in the housing and having a longitudinal slot adapted to register with the slot in the tire member, a locking member slidable in the slot of the casing and movable therewith to and from a position in which it will extend through the slot in the tire member, and movable in the slot in the tire member into and out of locking engagement with the ring, and a screw rotatively mounted in the casing and having a threaded engagement with the locking member for moving the locking member to and from the locking position.

3. In tire securing mechanisms, two rings adapted to be respectively mounted in the grooves in a clencher rim, an annular tire member encircling the rings and having a slot and provided with a projection for engaging the inner side of one of the rings, a locking member extending through the slot and having means for lockingly engaging with the other ring, and a screw rotatively mounted on the tire member for moving the locking member to and from the locking position.

4. In tire securing mechanisms, two rings adapted to be respectively mounted in the grooves of a clencher rim, one of the rings having an annular groove in its inner side, an annular tire member encircling the rings and having a slot and provided with a projection for engaging the inner side of the other ring, a locking member extending through the slot and having a projection for entering said annular groove, and a screw rotatively mounted on the tire member for moving the locking member to and from the locking position in which the projection of the locking member is in the annular groove.

5. In tire securing mechanisms, two rings adapted to be respectively mounted in the grooves of a clencher rim, an annular tire member encircling said rings and having a plurality of slots, the tire member having a projection for engaging the inner side of one of the rings, a plurality of locking members respectively extending through said slots and having each means for lockingly engaging with the other ring, and a plurality of screws rotatively mounted on the tire member and having threaded engagement with the locking members respectively for moving said locking members to and from the locking positions.

6. In tire securing mechanisms, two rings adapted to be respectively mounted in the grooves of a clencher rim, an annular groove being provided in the inner side of one of the rings, an annular tire member encircling the rings and having a plurality of slots and provided with a projection for engaging with the inner side of the other ring, a plurality of locking members extending respectively through said slots and having each a lateral projection for entering said annular groove, and a plurality of screws rotatively mounted on the tire member and having threaded engagement with the locking members respectively for moving said locking members to and from positions in which the projections of the locking members will be in said annular groove.

In testimony whereof I have signed my name to this specification in presence of two subscribing witnesses.

LUTHER L. GREGG, Jr.

Witnesses:
E. B. HOUSE,
FLORENCE M. VENDIG.

Copies of this patent may be obtained for five cents each, by addressing the "Commissioner of Patents, Washington, D. C."